Feb. 11, 1958

R. L. MOORE 2,822,659

BALE GROUPING AND STACKING APPARATUS

Filed April 20, 1956

INVENTOR.
ROSS L. MOORE
BY
McMorrow, Berman & Davidson
ATTORNEYS

INVENTOR.
ROSS L. MOORE

Feb. 11, 1958 R. L. MOORE 2,822,659
BALE GROUPING AND STACKING APPARATUS
Filed April 20, 1956 4 Sheets-Sheet 4
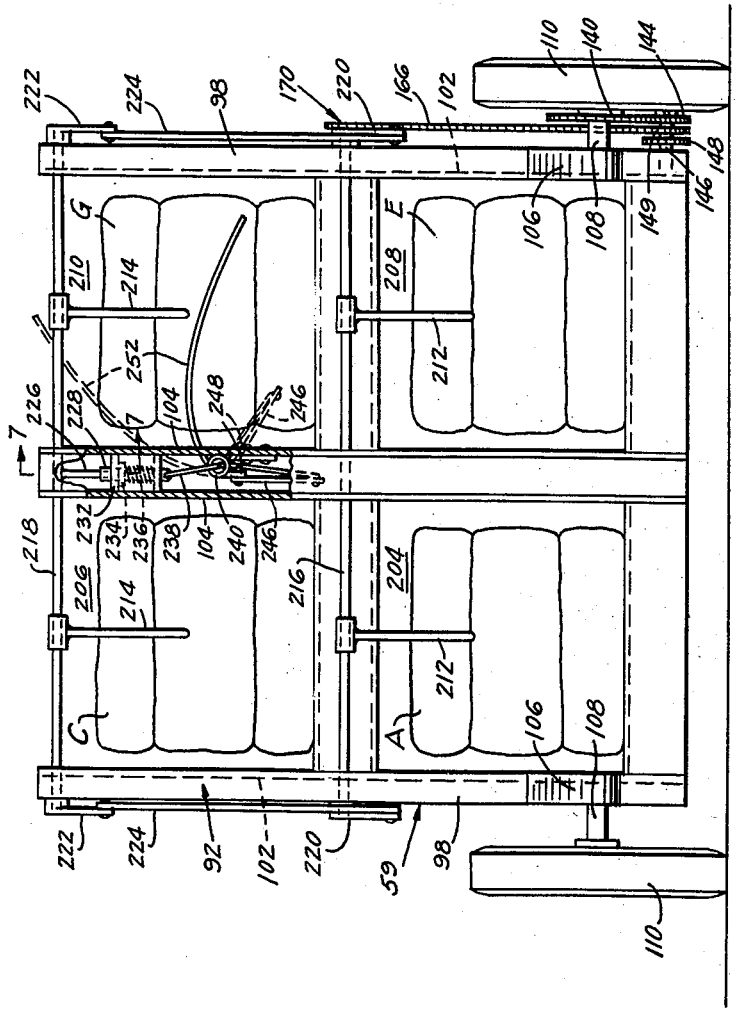
FIG. 5
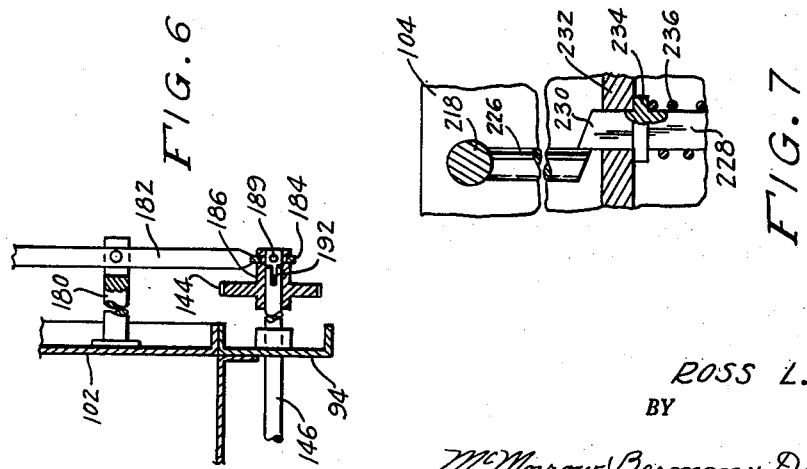
FIG. 6
FIG. 7
INVENTOR.
ROSS L. MOORE
BY
McMorrow, Berman + Davidson
ATTORNEYS United States Patent Office 2,822,659
Patented Feb. 11, 1958

2,822,659

BALE GROUPING AND STACKING APPARATUS

Ross L. Moore, Geary, Okla.

Application April 20, 1956, Serial No. 579,675

5 Claims. (Cl. 56—475)

This invention is a trailer type apparatus drawn by a conventional hay baler, which apparatus will receive bales from the baler; hold the bales until a plurality of them have been grouped; and will release the bales automatically after the group has been formed, depositing them in a new stack upon the field.

Heretofore, when a baler is in operation in a field, the farm operator may either permit the bales to drop from the baler one at a time, to the ground; or alternatively, have the baler draw a sled carrying a farm worker, who stacks a number of bales upon the sled and then causes them to be pushed from the sled for deposit on the ground in a small stack or group.

When the first practice is followed, each bale dropped is spaced from the other bales similarly dropped. Farm operators do not prefer this arrangement, since the individual bales are wholly exposed to the elements. Further, when the bales are later collected the task is made more difficult due to the fact that every bale is in a separate location upon the field.

The second practice is accordingly preferred, since the grouping of a number of bales not only reduces to a distinct degree the number of collection points, but also the grouped bales protect one another from the elements. However, following the second practice presents considerable difficulties. These may be readily recognized when one considers the duties of the worker riding the sled. The worker takes the bales from the bale chute of the baler, and stacks them upon the sled. When a selected number of bales have been stacked upon the sled, the worker utilizes a bar, forcing it into the ground through a longitudinal slot provided in the sled. As the baler moves in a forward direction, the upper portion of the bar is used as a lever, being pressed against the stacked bales. The worker thus swings the lever toward the rear of the sled, causing the bales to be pushed off the sled as the baler moves forwardly, so that the bales will be deposited in a stack of usually 6 to 12 bales.

The task is an exceedingly difficult one, due to the fact that the work must often be performed in hot summer heat. Further, the bales average approximately 70 or more pounds each, and move off the baler at an average rate of 3 to 5 bales per minute.

In accordance with the present invention, there is provided an apparatus which will automatically group bales as they move off the baler, and will automatically discharge them in a stack of eight bales, all without the necessity of attendance by a worker. The apparatus devised for the purpose of accomplishing this desirable object may be summarized briefly as follows:

A rollable frame is provided, adapted to be drawn by a baler in position to receive bales therefrom. The frame has four longitudinal bale chutes, arranged to provide two side-by-side lower chutes and two correspondingly arranged upper chutes. Means is provided that will cause bales to move off the baler first into one of the lower chutes; then into the upper chute above the chute first loaded; then into the other lower chute and then into the outer upper chute. Loading of the chutes automatically, in turn, is effected through the medium of a horizontally swingable gate and a pair of vertically swingable gates, actuated by the bales passing into the apparatus in a manner to cause the loading of the chutes in succession. When the chutes have been fully loaded, the last bale loaded into the last chute trips the stop release means, shifting to bale-releasing position a stop assembly located at the rear or discharge ends of the chutes. The bales fall to the ground, dropping in a neat stack, and the discharge of the bales results in automatic re-positioning of all the component parts of the apparatus, ready to receive the next group of bales.

Among important objects of the invention are the following:

To provide apparatus as stated that will be relatively simple, so as to be capable of manufacture at relatively low cost;

To provide such apparatus that will operate efficiently, without attendance by workers;

To provide a considerable saving, due to the necessity of eliminating a worker heretofore required, while still obtaining the desired grouping or stacking of the bales at a minimum number of collection points in the field; and To so form the apparatus that it will be attachable to a conventional hay baler without modification or redesign of said baler in any way.

Other objects will appear from the following description, the claims appended thereto, and from the annexed drawing, in which like reference characters designate like parts throughout the several views, and wherein:

Figure 5 is an enlarged rear end elevational view of the apparatus as seen from the line 5—5 of Figure 1, portions being shown in section;

Figure 6 is an enlarged, detail sectional view of a clutch mechanism; and

Figure 7 is an enlarged, detail sectional view of the latch mechanism associated with the bale stop assembly.

Figure 1:
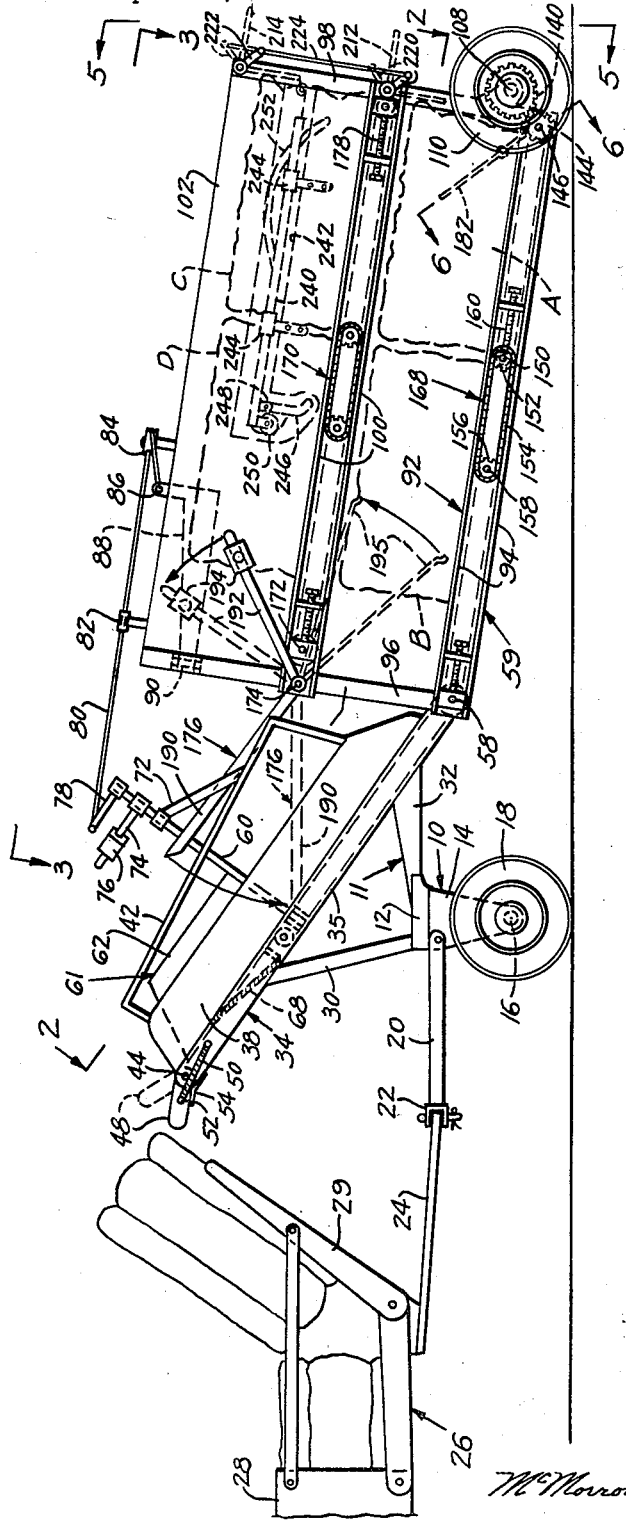
Figure 1 is a side elevational view of apparatus formed according to the present invention.

Referring to the drawings in detail, the apparatus comprises a wheel-supported trailer generally designated 10 having at its front end a rollable apron support frame generally designated at 11 (Figure 1) including a horizontally, transversely extending cross bar 12 rigid at its opposite ends with depending wheel hangers 14 in which are journalled the ends of a front wheel axle 16 carrying front wheels 18. Connected to hangers 14 are the divergent ends of the arms of a V-shaped yoke or tongue 20 having at its forward end a clevis 22, connectable to a draw bar 24 projecting rearwardly from a conventional hay baler generally designated 26, having a bale chute 28 from which are forced, in following succession, bales, which, in accordance with the invention, are caused to travel upwardly upon an inclined plate 29 to the grouping and stacking apparatus constituting the invention.

Apron support frame 11 includes, rigid with cross bar 12, transversely spaced, upwardly projecting arms 30 and rearwardly extending, substantially horizontal arms 32 fixedly connected at their outer ends to and supporting in inclined position an apron assembly generally designated 34.

Figure 2:
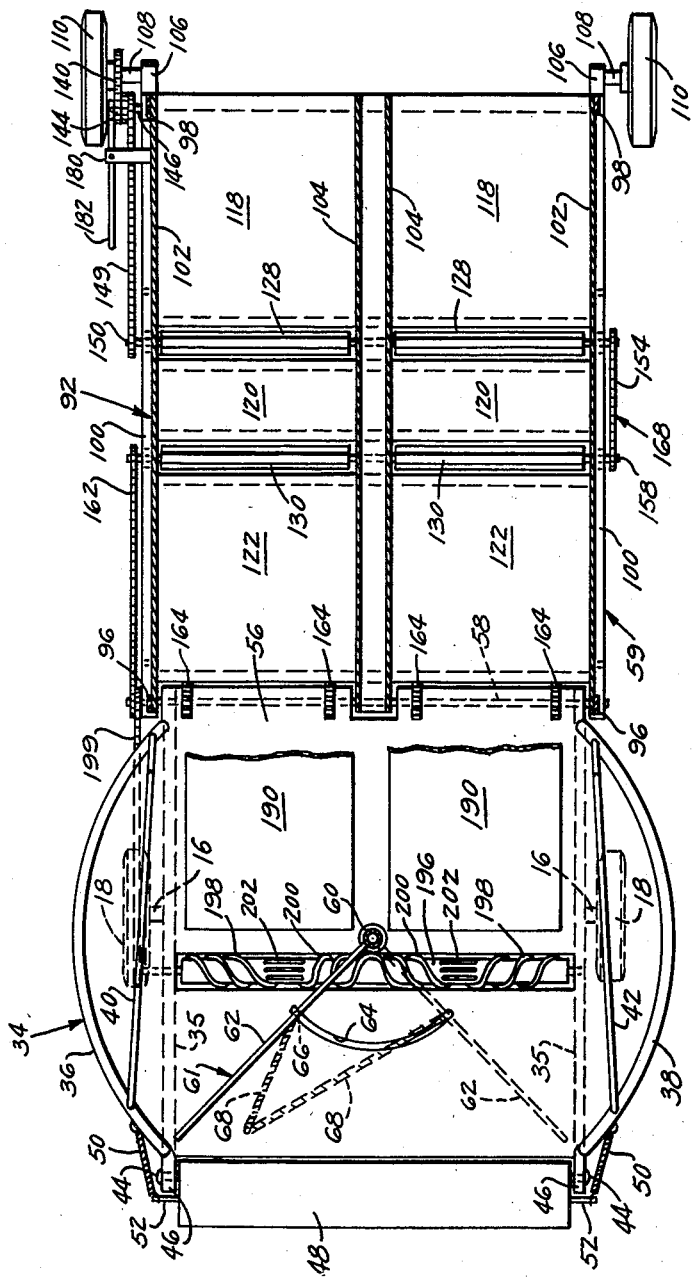
Figure 2 is a plan sectional view on line 2—2 of Figure 1.

Assembly 34 includes parallel, straight support rails 35 fixedly secured to the arms 30, 32 and fixedly mounted upon support rails 35 are arcuately, outwardly bowed side walls 36, 38 (see Figures 1 and 2). Connected between the ends of side wall 36 and projecting thereabove, is a straight guide rail 40. A similar guide rail 42 is secured to side wall 38. The guide rails (see Figure 1) are in the form of shallow, inverted U's, and converge slightly toward the rear of the apparatus (Figure 2) to guide the bales into the chutes of the structure.

A rod 44 is connected between short, straight, front end extensions 46 of side walls 36, 38 and pivotally supports for swinging movement, between the normal full line position of Figure 1, and a bale-stopping dotted line position also shown in this figure, a guide flap 48 extending the full width of the front end of the apron. Over-center springs 50 are connected between the apron side walls and outwardly projecting pins 52 carried by the flap, and normally hold the flap in its full line, Figure 1 position. In this flap position, bales are free to move onto the apron from the baler. However, if by some chance the baler chute or a hay bale should contact the safety leaf or flap 48 from below, the flap will be pushed up, with the springs moving across a dead center to snap the flap to its upper position to prevent damage to the hay, baler chute, or the apparatus constituting the present invention.

Limiting downward swinging movement of the flap is a plate 54 (Figure 1) connected to the front end of the platform or floor plate 56 of the apron. Platform 56 extends the full width and length of the apron (Figure 2) and is carried by an elongated bar 58 extending transversely of the front end of a chute structure generally designated 59. The chute structure, like the apron assembly, inclines downwardly toward the rear of the apparatus for rotational movement of the bales from the front to the rear end of the structure. However, it is inclined to a lesser degree than the apron assembly. A fixed connection, not shown, is effected between the frame 11 and the chute structure 59 to prevent relative swinging movement of the same about the axis of the bar 58. Obviously, this connection can be braced in any suitable manner desired.

The chute structure has four chutes, each opening upon the front and rear ends of chute structure 59. There are two lower, side-by-side chutes and two upper, side-by-side chutes. Hereinafter, to facilitate understanding of the invention, the term "left" will refer to chutes and other components at or moving to the left side of the structure as it would be seen when viewed from the rear as in Figure 5. The term "right" will be correspondingly used to designate components and parts at or moving to the right of the structure 59, viewing the same as in Figure 5.

Means on the apron assembly, for deflecting bales to left or right into left or right hand chutes has been generally designated at 61 and in its basic essentials comprises a horizontally swinging gate 62, secured fixedly to an upstanding post 60 rigidly secured to floor plate or platform 56 at the center of the platform, and extending upwardly from the platform perpendicularly to the plane thereof. For limiting swinging movement of gate 62 in opposite directions (see Figure 2) there is an arcuate slot 64 curved about the center or pivot axis defined by post 60, and receiving a depending pin 66 secured to the intermediate portion of gate 62. A spring 68 is connected between pin 66 and the underside of platform 56, adjacent one side of platform 56. The spring normally maintains gate 62 in the full line position shown in Figure 2, at the right side of the platform, preventing entry of the bales into the right hand chutes. However, the gate may swing to the dotted line position of Figure 2, to close the left hand chutes while deflecting bales to the right hand chutes.

Referring to Figure 1, to support the post in its upstanding position is a bracket or arm 72 (Figure 1), having a sleeve receiving the upper end portion of the post, said arm being fixedly secured to one of the guide rods, as for example the guide rail 42, at a height sufficient to permit passage of the bales under the arm 72.

Above the bracket 72, there is fixedly secured to post 60, as by a set screw or the like, a sleeve from which extends a weight support arm 74 carrying a weight 76 adjustable longitudinally of arm 74 (see Figures 1 and 3) to aid spring 68 in normally shifting gate 62 to its full line position of Figure 2.

At the upper end of the post 60, there is secured a sleeve, from which extends a radial arm 78 (see Figure 3) to the outer end of which is connected a cable 80 passing about a pulley 82 mounted upon the structure 59 medially between opposite sides thereof. Cable 80, after passing around pulley 82, passes around pulley 84, after which the cable is connected (see Figures 1 and 3) to the upwardly projecting extension 86 of a cable-shifting arm 88 pivotally connected at 90 to the front end of structure 59 at one side of the structure. The cable shift arm 88 is normally positioned as in full lines in Figure 3, being so positioned because of pull on the cable when the gate 62 swings to its right hand position of Figure 2. In this position of arm 88 it extends obliquely within the upper left hand chute. Therefore, a bale entering the left hand chute will deflect the arm 88 to the dotted line position of Figure 3, and this causes pull on the cable, causing, in turn, swinging of the post 60 to swing the gate 62 to the dotted line position of Figure 2.

The chute structure includes horizontal and vertical plates defining a frame generally designated 92, which plates are so arranged as to form the four longitudinal chutes. Thus, to provide a floor for the lower chutes there are provided bottom floor plates 94 spaced closely apart (Figure 1). Extending upwardly from the four corners of the plates 94 are front corner posts 96, and rear corner posts 98.

Also connected at their corners to the posts 96, 98 are upper floor plates 100, the lower one of which provides a roof for the lower chutes and the upper one of which provides a floor for the upper chutes.

Forming outer side walls for the several chutes are vertical side plates 102 extending from the bottom to the top of the chute structure 59, while vertical, transversely spaced inner side walls 104 (Figures 2 and 5) extend from the front to the rear ends of the chute structure, medially between the opposite sides of said structure.

The inner side walls 104 form a longitudinal partition, and it will be seen that the inner and outer side walls, and the lower and upper floor plates, define four chutes of rectangular cross section, arranged as hereinbefore described.

At its rear end, the chute structure 59 is supported upon rear wheels, and to this end, rigid with and projecting rearwardly from the sides of the chute structure at the rear end thereof (Figure 2) are bearing plates 106, on which are fixedly mounted outwardly projecting stub axles 108 on which are rotatable rear wheels 110.

The right hand rear wheel, on rotation, is adapted to drive conveyor means, which conveyor means will aid the gravitational movement of the bales within the chutes to the discharge ends thereof. To this end, conveyor rollers, to be described hereinafter, are mounted in the floors of the several chutes.

Figure 3:
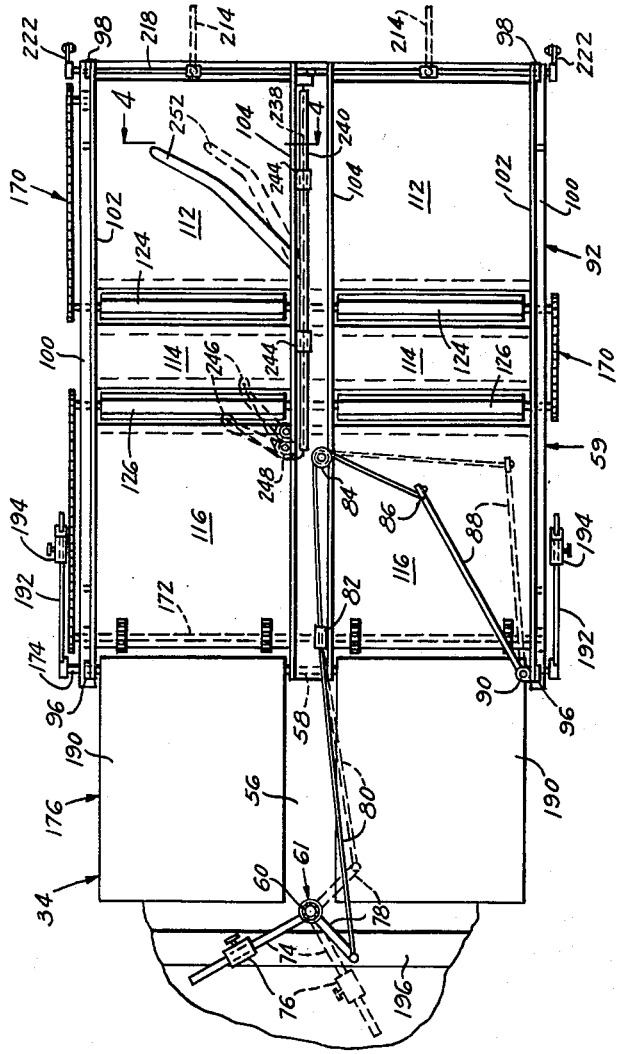
Figure 3 is a top plan view on line 3—3 of Figure 1.
Figure 4:
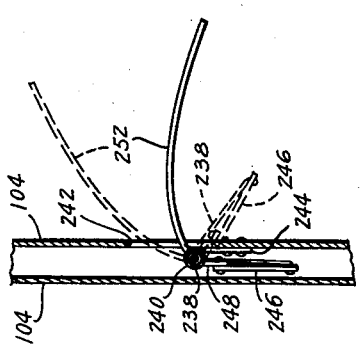
Figure 4 is an enlarged, detail sectional view on line 4—4 of Figure 3.

As shown in Figure 3, the upper floor plates are divided into sections spaced apart to define transversely extending slots therein within which the rollers are rotatably mounted. Thus, the floor of the upper chutes is divided into rear sections 112, relatively narrow intermediate sections 114, and front sections 116. The floor of the lower chutes is similarly divided into rear floor sections 118, intermediate sections 120, and front sections 122.

Mounted in the slots or spaces defined between sections 112, 114 are cleated rollers 124, while similar rollers 126 are mounted between the sections 114, 116. In the floor of the lower chute, there are similarly mounted rollers 128, 130.

All the rollers are driven from the right rear wheel 110. To this end, secured to the hub of this wheel is a drive gear 140, meshing with a smaller, driven gear 144 which, in a manner to be made presently apparent, is adapted to be selectively engaged with or disengaged from an elongated shaft 146 journalled in the chute structure at the rear end thereof, between the lower floor plates 94.

Referring to Figures 2 and 5, secured to the shaft 146 adjacent gear 144 is a sprocket 148 about which is trained a chain 149 extending along the right hand side of the chute structure adjacent the lower floor plates. Chain 149, at its front end (see Figure 2), is trained about a sprocket secured to one end of shaft 150 journalled in the chute structure between the lower floor plates and extending the full width of the chute structure. Secured to the shaft 150 are the rear lower conveyor rollers 128. Due to the meshing gears 140, 144, the lower conveyor rollers 128 will be rotated oppositely to the direction of rotation of the main drive gear 140, so as to cause the rollers to turn clockwise in Figure 1, thus to cause bales riding over the rollers to travel toward the discharge or rear end of the apparatus.

At its opposite end, the shaft 150 is fixedly secured to (see Figures 1 and 2) a sprocket 152, about which is trained a chain 154 extending along the lower floor plates at the left hand side of the apparatus. Chain 154 is trained about a sprocket 156, secured to the left hand end of a shaft 158 to which are secured the front lower conveyor rollers 130.

To drive the upper conveyor rollers simultaneously with the lower conveyor rollers, there is provided a conveyor drive means duplicating closely the lower sprocket and chain drive means. In this connection, it will be understood that the chains can be adjusted as to slack, and referring to Figure 1, tension-adjusting means 160, in the form of a screw shiftable longitudinally of the chain and connected to a block passed about shaft 150, is provided. The tension-adjusting screw 160 can be duplicated at any of various other locations, wherever a chain needs to be adjusted as to the slack therein.

At the right hand end of the shaft 158, there is provided a sprocket turning with shaft 158, and trained about this sprocket is a chain 162 extending along the right hand side of the apparatus adjacent the lower floor plates 94. Chain 162 is trained at its forward end about the right hand end of the bar 58, and secured to said bar, in the front ends of the lower chutes, are cleated wheels 164, a pair of said wheels being provided in the front end of each lower chute.

Thus, bales entering the lower chutes after gravitating along the apron platform are engaged at their undersides by the wheels 164, and shifted into the lower chutes, after which they arrive at the front lower conveyor rollers 130.

As previously noted, the conveyor drive means for the upper chutes substantially duplicates that for the lower chutes. To this end, referring to Figure 5 a chain 166 is trained about a sprocket secured to the right hand end of shaft 146 adjacent sprocket 148. Chain 166 extends upwardly at the rear end of the structure, being trained at its upper end about a sprocket that discharges the same function as the sprocket 148, that is, drives the upper conveyor rollers.

The lower conveyor drive assembly has been generally designated at 168, while the upper assembly has been generally designated at 170.

There are certain small differences between the upper assembly 170 and the lower drive assembly 168. Referring to Figure 3, the front end shaft 172 of the upper assembly is spaced rearwardly from a bar 174 that extends transversely of the front end of a chute structure in the plane of the floor of the upper chutes, a pair of vertically swingable deflector plates being mounted upon the bar 174 to provide means 176 for closing the lower chutes while opening the upper chutes and vice versa.

Further, a tension-adjusting means is differently located in the upper conveyor drive assembly. In Figure 1 there is shown a tension-adjusting screw 178 disposed at the rear end of the upper drive assembly 170.

When the machine is in use, the gears 140, 144 are in mesh. However, assuming that the machine is pulled from one field to another, it is desirable to disengage the conveyor drive assemblies so that they will not be driven under these circumstances. To accomplish this, there is provided a clutch means shown to particular advantage in Figure 6. A bracket 180 is rigid with and projects laterally from the right side wall 102, and pivoted on the bracket is a handle or lever 182 provided at one end with a sliding pivotal connection to a shifting fork 184 extending in a circumferential groove provided in a sleeve 186 to which the gear 144 is secured. Extending diametrically of the sleeve is a pin 189, adapted to extend into a longitudinal slot 192 provided in the shaft 146. The sleeve 186 is slidable axially of the shaft 146, and when the handle is in the position shown in Figure 6 the pin 189 is disengaged from slot 192. Accordingly, when wheel 110 turns to rotate gear 140 and thus rotate gear 144, the shaft 146 will not be driven and accordingly the conveyor drive assemblies 168, 170 will correspondingly not be driven. When the handle 182 is rocked clockwise from its Figure 6 position, the gear 144 is placed in driving relation to shaft 146.

As previously noted herein, the gate assembly 61 serves the function of guiding bales either to the left or right, that is, either into the upper and lower left hand chutes, or the upper and lower right hand chutes. The deflector assembly 176 serves the function of guiding the bales either upwardly or downwardly, that is, into the left and right lower chutes, or the left and right upper chutes. To this end, individually pivoted on bar 174 to swing independently of each other about horizontal axes extending in the planes of the floors of the upper chutes, are forwardly projecting, flat, rectangular doors or deflector plates 190. The doors 190 (see the full line position in Figure 1) are counterweighted to normally swing to upper positions and to this end, secured to the respective doors opposite ends of the bar 174 are radial, rearwardly projecting weight support arms 192 on which are adjustably mounted counterweights 194. The counterweights are positioned to normally swing the doors 190 upwardly to their full line positions of Figure 1, so that bales sliding down the platform of the apron will move into the lower chutes.

Secured fixedly to the left hand door 190 is a plate or arm 195 inclining downwardly rearwardly within the lower left hand chute when the door 190 is in its normal, elevated position. A bale entering the lower left hand chute will thus strike the left hand plate 195, swinging it upwardly to throw the left hand door 190 to its lower position.

Means is also provided to aid the gravitational movement of the bales along the apron into the chutes. To this end, there is provided an auger-type roller 196 journalled in a transverse slot provided in the apron platform intermediate the opposite ends of said platform, and extending fully from side to side of the platform as shown in Figure 2. At the ends of the roller 196 there are provided spiralling ribs 198, the rib at one end of the roller being of opposite hand as compared to the rib at the opposite end of the roller. At opposite sides of the midlength point of the roller there are provided spiralling ribs 200 of opposite hand, the rib 200 at one side of the midlength point of the roller being of opposite hand in respect to the rib 198 at the same side of said midlength point. Between the ribs 198, 200 at each end of the roller there are provided longitudinally extending, circumferentially spaced cleats 202.

The auger 198 is under direct drive from the lower conveyor roller drive assembly 168, and to this end there is provided an auger drive chain 199 (Figure 2) trained about a sprocket connected to the right hand end of the shaft 58, and trained also about a sprocket connected to the right hand end of the auger shaft.

The particular formation and arrangement of the auger type roller is such as to cause the same to grip the undersides of bales sliding downwardly upon the apron platform, to shift the same toward the respective chutes.

For convenience in facilitating an understanding of the operation, the several chutes have been provided with reference numerals as shown in Figure 5. Thus, there is a lower left hand chute 204, an upper left hand chute 206, a lower right hand chute 208, and an upper right hand chute 210.

Normally preventing discharge of the bales from the lower chutes are depending stop fingers 212, while similarly arranged at the discharge ends of the upper chutes are depending stop fingers 214. The lower fingers are secured fixedly to a bar 216 extending across the chute structure, the upper stop fingers being connected to a bar 218, the bars 216, 218 being rockably mounted within the outer side walls and longitudinal partition of the apparatus.

The bars 216, 218 are linked for joint rocking movement in opposite directions. To this end, said bars, at their opposite ends, are provided with radial arms or cranks 220, 222, and at each side of the structure there is pivotally connected, between the lower and upper cranks, connecting links 224.

Means is provided for normally latching the several stop fingers in their bale-engaging positions. Said means comprises a single latching assembly for all the stop fingers, shown to particular advantage in Figures 5 and 7. Fixedly secured to and depending from the midlength portion of the upper stop fingers support bar 218 is a latch arm 226, the lower end of which is beveled slightly as shown in Figure 7. The latch arm is adapted to engage in back of the upper end portion of a vertically slidable latching plunger 228, the upper extremity of which is beveled at 230 to provide a cam surface engageable by the correspondingly beveled lower end of the arm 226. The plunger 228 slides in the top wall of a latch housing 232, mounted between the inner side walls 104 at the rear end of the apparatus, and formed upon the plunger is a collar 234 limiting upward movement of the plunger within the top wall of housing 232. A compression, coil spring 236 surrounds the plunger 228, bearing at one end against collar 234 and at its other end against the bottom wall of the latch housing.

Connected to the lower end of the plunger 228 is a pull cable 238, extending into the rear end of an elongated tube 240 (Figure 3). Tube 240 extends within the space between the inner side walls 104, adjacent an elongated opening 242 formed in the right hand side wall 104 (see Figure 1). The tube is rotatably mounted within brackets 244 mounted on said right hand side wall 104.

At its inner end, the tube carries a latch release arm 246, pivoted upon a bracket 248 that is rigidly secured to and extends radially of the tube 240. At the inner end of the tube, there is mounted thereon a pulley 250, about which the cable is trained after being extended out of the inner end of the tube (see Figure 1). The inner end of the cable is connected to the latch release arm 246.

Also carried by the tube is an elongated release arm positioning member 252 curved longitudinally and extending obliquely within the upper right hand chute 210. The member 252 is so formed that when a bale enters the chute 210, moving to the discharge end thereof, it will strike the arm member 252 and will bias the same upwardly to rotate tube 240 counterclockwise in Figure 5. Normally, when the arm member 252 is in its lower position as shown in full lines in Figure 5, the latch release arm 246 is recessed within the center partition. When the arm member 252 is biased upwardly, however, the rotational movement of the tube 240 swings the arm member 246 to the dotted line position shown in Figure 5, in which position it will be in the path of the last bale entering the upper right hand chute 210.

The apparatus operates in the following manner:

Normally, all parts are positioned as in full lines in the several figures of the drawing. Gate 62 is in its right hand position, and doors 190 are in their upper position. The stop fingers are in their lower position, with latch arm 226 engaged in back of plunger 230 as in Figure 7.

For convenience in understanding the operation, the bales within the chutes have been given reference letters designating the order in which they are loaded. Thus, referring to Figure 5, there is a bale A which will be the first bale loaded, and will move into the lower left hand chute 204, passing to the discharge end thereof, where it will be engaged by stop fingers 212. The next bale loaded will be a bale B, which will also enter the chute 204, behind bale A. The next bale loaded is a bale C, entering the upper left hand chute 206, and moving to the discharge end thereof. A bale D will enter the upper left hand chute behind bale C. Next loaded is a bale E, moving to the discharge end of the lower right hand chute 208, followed by a sixth bale, not shown, that will be located behind bale E in chute 208. Next loaded is a bale G moving into the right hand chute 210 to the discharge end thereof, and last loaded is an eighth bale not shown, moving into the chute 210 behind bale G. All bales will be confined within the chutes until the eighth bale is loaded after which the loading of the eighth bale trips the latch, causing all stop fingers to be freed for movement to bale-releasing positions, as a result of which the bales will drop out of the discharge end of the chutes and will be stacked in a group upon the field, with all parts returning to their normal positions awaiting loading of the next eight bales.

The operation proceeds as follows: bale A moves off the baler 26, onto the apron platform 56. Gate 62 is in its right hand position, so bale A is guided to the left. Doors 190 are elevated so bale A moves into lower left hand chute 204 traveling to the discharge end of chute 204, where it will come to rest in engagement with stop finger 212.

As bale A enters chute 204, it strikes the left hand plate or arm 195, throwing the same upwardly. This swings the left door 190 downwardly. However, as soon as bale A pases plate 195, the left door 190 swings upwardly immediately due to the provision of the counterweight 194, before bale B arrives on the apron platform.

Therefore, as bale B arrives on the platform 56, it also is deflected into the lower left hand chute 204 by gate 62.

However, bale B, when it swings the left hand plate 195 upwardly, holds plate 195 in its upper position shown in Figure 1, since bale B cannot move to the discharge end of the chute, instead coming to rest against the rear end of bale A, which was previously loaded.

Therefore, gate 62 is still in its right hand position but the left hand door 190 is now held downwardly.

Therefore, bale C, though deflected to the left by gate 62, will travel upwardly onto the left hand door 190, into the upper left hand chute 206. Bale C, as it enters the upper left hand chute, strikes arm 88 (see Figure 3) swinging it into its dotted line position. This swings gate 62 to its left hand position shown in dotted lines in Figure 2, but only momentarily, due to the fact that bale C immediately passes arm 88 and moves to the discharge end of upper left hand chute 206, coming to rest against stop finger 214.

Bale D now arrives on the platform, and since gate 62 has returned under the pull of spring 68 to its normal position, bale D is deflected to the left into the upper left hand chute 206.

With gate 62 returning to its normal position due to the passage of bale C past arm 88, bale D, on arriving on the platform, is deflected to the left and upwardly by gate 62 and the now lowered left hand door 190, and moving into the upper left hand chute 206 strikes arm 88, shifting it to the dotted line position of Figure 3.

The arm 88 will now be held in the dotted line position, since bale D remains at the inlet end of the upper left hand chute 206.

As a result, gate 62 is now held in the left hand position of Figure 2, so that all bales now arriving will be deflected to the right. Right hand door 190, however, is in its up position. Therefore, bale E, arriving on the platform, is deflected to the right, and passes into the lower right hand chute 208, moving to the discharge end of said chute. The sixth bale, as it arrives, is also deflected into the lower right hand chute 208, and striking the right hand arm 195, holds it up, so that the right hand door 190 is held down.

Bale G, accordingly, will be deflected to the right and up to now lowered right hand door 190, into the upper right hand chute 210. As it moves to the discharge end of said chute, it deflects member 252 upwardly, to the dotted line position of Figure 5.

The upper swinging of member 252 causes counter-clockwise rotation of tube 240, viewing the same as in Figure 5. As a result, latch release arm 246, which hitherto has depended vertically within the partition, swings out through the partition opening 242 to the dotted line position of Figure 5.

Therefore, the eighth bale, the last bale loaded, is deflected into the upper right hand chute, and striking arm 246 swings it forwardly, to the right hand dotted line position of the arm 246 shown in Figure 3. This causes a pull to be exerted upon the cable 238, as a result of which said cable pulls downwardly the plunger 228. The plunger is thus disengaged from the latching arm 226, and the pressure of the bales A, C, E, G on the stop fingers 212, 214 causes said fingers to swing upwardly to the dotted line positions of Figure 1. This releases all the bales for discharge, and the bales drop out of the chutes, being grouped or stacked upon the ground.

When the chutes are clear, the doors 190 will swing to their normal, upper positions, since there is no longer anything to prevent the arms 195 from swinging downwardly, the doors 190 therefore swinging upwardly under the weight of the counterweights 194. Further, the gate 62 returns to its right hand position, under the pull of spring 68, since no longer is bale D in engagement with the gate-actuating arm 88. Still further, the stop fingers are free to swing downwardly under their own weight, and when they swing downwardly, move past a vertical position, by reason of their momentum, so that latch arm 226 cams plunger 230 downwardly to move in back of the plunger as shown in Figure 7, thus latching the stop fingers in their bale-engaging positions awaiting the next loading of the apparatus. Further, the member 252 is no longer engaged by bale G, and tends to gravitate to its lower position shown in Figure 5, so as to cause rotational movement of the tube 240 in a clockwise direction viewing the same as in Figure 5, returning the latch release arm 246 to its normal, vertically depending position.

The apparatus is thus readied for the next bale arriving from the baler, which will move into the lower left hand chute, to repeat the cycle.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. A bale grouper comprising a mobile chute structure partitioned into four elongated, parallel, open-ended chutes coextensive with one another and arranged to extend in a fore-and-aft direction in the structure, said chutes including a first chute, a second chute overlying the first chute, a third chute side-by-side with the first chute, and a fourth chute overlying the third chute and side-by-side with the second chute; a loading platform connected to and projecting forwardly from the bottoms of the front ends of the first and third chutes for guiding bales into the first and third chutes; deflector plates projecting forwardly from the bottoms of the second and fourth chutes above the platform and pivoted on the chute structure to swing on a horizontal, transverse axis between a normal, raised, first position permitting bales to enter the first and third chutes, and a lowered, second position deflecting bales into the second and fourth chutes; a gate pivoted on the platform forwardly of the deflector plates on an axis extending in an up-and-down direction, said gate being swingable from side to side of the platform between a normal, first position diverting bales to the first and second chutes and a second position diverting bales to the third and fourth chutes; movable means respectively having connections with the deflector plates and gate effective, on movement of said means, to bias the plates and gate to their second positions; stop means mounted in the aft parts of the several chutes for movement between normal first positions blocking passage of the bales out of the several chutes, and second positions freeing the bales for passage out of the several chutes; and means connected with the stop means and operative for movement between first and second positions effective for causing movement of the stop means between the first and second positions, respectively, of said stop means.

2. A bale grouper comprising a mobile chute structure partitioned into four elongated, parallel, open-ended chutes coextensive with one another and arranged to extend in a fore-and-aft direction in the structure, said chutes including a first chute, a second chute overlying the first chute, a third chute side-by-side with the first chute, and a fourth chute overlying the third chute and side-by-side with the second chute; a loading platform connected to and projecting forwardly from the bottoms of the front ends of the first and third chutes for guiding bales into the first and third chutes; deflector plates projecting forwardly from the bottoms of the second and fourth chutes above the platform and pivoted on the chute structure to swing on a horizontal, transverse axis between a normal, raised, first position permitting bales to enter the first and third chutes, and a lowered, second position deflecting bales into the second and fourth chutes; a gate pivoted on the platform forwardly of the deflector plates on an axis extending in and up-and-down direction, said gate being swingable from side to side of the platform between a normal, first position diverting bales to the first and second chutes and a second position diverting bales to the third and fourth chutes; means movably mounted in the fore parts of the first, third and second chutes respectively, normally positioned in the path of bales entering the first, third and second chutes so as to be shifted by the bales, said means of the first and third chutes having connections with the respective deflector plates and said means of the second chute having connections with the gate such as to bias said plates and gate to their respective second positions when said means are so shifted; stop means mounted in the aft parts of the several chutes for movement between normal first positions blocking passage of the bales out of the several chutes, and second positions freeing the bales for passage out of the several chutes; and means mounted in the chute structure for movement within the fore part of the fourth chute and extending, in a first position to which moved, in the path of bales entering the fourth chute to be shifted thereby to a second position, said last named means having a connection to the stop means operative to shift the stop means to its bale-freeing position when said last named means is biased to its second position.

3. A bale grouper comprising a mobile chute structure partitioned into four elongated, parallel, open-ended chutes coextensive with one another and arranged to extend in a fore-and-aft direction in the structure, said chutes including a first chute, a second chute overlying the first chute, a third chute side-by-side with the first chute, and a fourth chute overlying the third chute and side-by-side with the second chute; a loading platform connected to and projecting forwardly from the bottoms of the front ends of the first and third chutes for guiding bales into the first and third chutes; deflector plates projecting forwardly from the bottoms of the second and fourth chutes above the platform and pivoted on the chute structure to swing on a horizontal axis extending transversely of the chute structure between a normal, raised, first position permitting bales to enter the first and third chutes, and a lowered, second position in which the plates are disposed for deflecting bales into the second and fourth chutes; a gate pivoted on the platform forwardly of the deflector plates on an axis extending in an up-and-down direction, said gate being swingable from side to side of the platform in each of the first and second positions of the deflector plates between a normal, first position diverting bales to the first and second chutes and a second position diverting bales to the third and fourth chutes; and stop fingers pivotally mounted in the aft parts of the several chutes to swing between first and second positions, the stop fingers in the first positions thereof extending across the path of bales passing through the chutes to block movement of the bales through the aft ends of the chutes, said stop fingers in their second positions being disposed to free the bales for movement through the aft ends of the several chutes.

4. A bale grouper comprising a mobile chute structure partitioned into four elongated, parallel, open-ended chutes coextensive with one another and arranged to extend in a fore-and-aft direction in the structure, said chutes including a first chute, a second chute overlying the first chute, a third chute side-by-side with the first chute, and a fourth chute overlying the third chute and side-by-side with the second chute; a loading platform connected to and projecting forwardly from the bottoms of the front ends of the first and third chutes for guiding bales into the first and third chutes; deflector plates projecting forwardly from the bottoms of the second and fourth chutes above the platform and pivoted on the chute structure to swing on a horizontal, transverse axis between a normal, raised, first position permitting bales to enter the first and third chutes, and a lowered, second position deflecting bales into the second and fourth chutes; a gate pivoted on the platform forwardly of the deflector plates on an axis extending in an up-and-down direction, said gate being swingable from side to side of the platform between a normal, first position diverting bales to the first and second chutes and a second position diverting bales to the third and fourth chutes; means movably mounted in the fore parts of the first, third and second chutes respectively, normally positioned in the path of bales entering the first, third and second chutes so as to be shifted by the bales, said means of the first and third chutes having connections with the respective deflector plates and said means of the second chute having connections with the gate such as to bias said plates and gate to their respective second positions when said means are so shifted, the means connected with the deflector plates comprising deflector arms secured to the respective deflector plates to pivot therewith, said deflector arms normally inclining downwardly rearwardly within the fore parts of the first and third chutes in the path of bales entering the same so as to be thrown upwardly thereby for swinging the deflector plates downwardly to their second positions, the deflector arms being so disposed as to be held in their upwardly thrown positions by bales remaining in the fore parts of the first and third chutes owing to abutting of the bales against bales previously entering the first and third chutes; stop means mounted in the aft parts of the several chutes for movement between normal first positions blocking passage of the bales out of the several chutes, and second positions freeing the bales for passage out of the several chutes; and means mounted in the chute structure for movement within the fore part of the fourth chute and extending, in a first position to which moved, in the path of bales entering the fourth chute to be shifted thereby to a second position, said last named means having a connection to the stop means operative to shift the stop means to its bale-freeing position when said last named means is biased to its second position.

5. A bale grouper comprising a mobile chute structure partitioned into four elongated, parallel, open-ended chutes coextensive with one another and arranged to extend in a fore-and-aft direction in the structure, said chutes including a first chute, a second chute overlying the first chute, a third chute side-by-side with the first chute, and a fourth chute overlying the third chute and side-by-side with the second chute; a loading platform connected to and projecting forwardly from the bottoms of the front ends of the first and third chutes for guiding bales into the first and third chutes; deflector plates projecting forwardly from the bottoms of the second and fourth chutes above the platform and pivoted on the chute structure to swing on a horizontal, transverse axis between a normal, raised, first position permitting bales to enter the first and third chutes, and a lowered, second position deflecting bales into the second and fourth chutes; a gate pivoted on the platform forwardly of the deflector plates on an axis extending in an up-and-down direction, said gate being swingable from side to side of the platform between a normal, first position diverting bales to the first and second chutes and a second position diverting bales to the third and fourth chutes; means movably mounted in the fore parts of the first, third and second chutes respectively, normally positioned in the path of bales entering the first, third and second chutes so as to be shifted by the bales, said means of the first and third chutes having connections with the respective deflector plates and said means of the second chute having connections with the gate such as to bias said plates and gate to their respective second positions when said means are so shifted, the means connected with the gate comprising a gate-operating arm pivoted within the fore part of the second chute for swinging movement in a horizontal plane, said arm normally extending obliquely to the length of the second chute in the path of bales entering the second chute so as to be swung from its normal position by said bales entering the second chute, and a flexible element connected at one end with said arm and having at its other end a connection with the gate, said flexible element being arranged for swinging the gate from its first to its second positions responsive to swinging of the arm from its normal position, said arm being so disposed as to be held in the position to which it is swung from its normal position by a bale remaining in the fore part of the second chute, owing to abutting of said bale against bales previously entering said second chute; stop means mounted in the aft parts of the several chutes for movement between normal first positions blocking passage of the bales out of the several chutes, and second positions freeing the bales for passage out of the several chutes; and means mounted in the chute structure for movement within the fore part of the fourth chute and extending, in a first position to which moved, in the path of bales entering the fourth chute to be shifted thereby to a second position, said last named means having a connection to the stop means operative to shift the stop means to its bale-freeing position when said last named means is biased to its second position.

References Cited in the file of this patent

UNITED STATES PATENTS 2,570,923 Dodge Oct. 9, 1951
2,736,159 Marshall Feb. 28, 1956